(12) United States Patent
Tavernier et al.

(10) Patent No.: US 11,362,555 B2
(45) Date of Patent: Jun. 14, 2022

(54) ROTOR WITH PERMANENT MAGNETS FORMING A PORTION OF A ROTOR CORE

(71) Applicant: MOVING MAGNET TECHNOLOGIES, Besançon (FR)

(72) Inventors: Stéphane Tavernier, Besançon (FR); Gaël Andrieux, Evilard (CH); Bastien Dolisy, Obernai (FR)

(73) Assignee: Moving Magnet Technologies, Besancon (FR)

( * ) Notice: Subject to any disclaimer, the term of this patent is extended or adjusted under 35 U.S.C. 154(b) by 136 days.

(21) Appl. No.: 16/500,304

(22) PCT Filed: Apr. 3, 2018

(86) PCT No.: PCT/FR2018/050824
§ 371 (c)(1),
(2) Date: Oct. 2, 2019

(87) PCT Pub. No.: WO2018/185421
PCT Pub. Date: Oct. 11, 2018

(65) Prior Publication Data
US 2020/0076254 A1    Mar. 5, 2020

(30) Foreign Application Priority Data

Apr. 3, 2017    (FR) .................................... 1752831

(51) Int. Cl.
*H02K 1/27*    (2022.01)
*H02K 1/276*    (2022.01)
*H02K 1/14*    (2006.01)

(52) U.S. Cl.
CPC .......... *H02K 1/2773* (2013.01); *H02K 1/141* (2013.01); *H02K 1/148* (2013.01); *H02K 2213/03* (2013.01)

(58) Field of Classification Search
CPC ...... H02K 1/2773; H02K 1/141; H02K 1/148; H02K 1/276; H02K 1/272; H02K 2213/03
(Continued)

(56) References Cited

U.S. PATENT DOCUMENTS 4,689,973 A * 9/1987 Hershberger ......... D06F 37/304
68/23.7
4,700,096 A * 10/1987 Epars ................... H02K 1/2773
310/156.61

(Continued)

FOREIGN PATENT DOCUMENTS

DE    102012105992 A1    11/2013
JP    S58151858 A    9/1983

*Primary Examiner* — Maged M Almawri
(74) *Attorney, Agent, or Firm* — Harness Dickey & Pierce PLC (57) ABSTRACT

The disclosure relates to a rotor for an electrical machine having internal permanent magnets including a yoke consisting of a stack of sheets defining a plurality of recesses for receiving parallelepipedal permanent magnets, the recesses being surrounded by magnetically saturated external transverse isthmuses, by radial isthmuses, lateral isthmuses and oblique isthmuses, wherein the magnets are assembled in pairs of magnets magnetized in the same direction and perpendicular to the radial direction of the radial isthmuses arranged between the coupled magnets, the radial isthmuses having a thickness of less than 5% of the diameter of the rotor, and the perimeter of the cross section of the rotor is formed by a succession of curved profiles, between two consecutive pairs of magnets, and tangential linear profiles at the external transverse isthmuses. The disclosure also relates to the application of such a rotor for creating a motor, in particular a motor for a turbo compressor, or an electrical generator.

9 Claims, 8 Drawing Sheets

(58) Field of Classification Search
USPC .............. 310/156.1, 156.53, 156.56, 156.57
See application file for complete search history.

(56) References Cited

U.S. PATENT DOCUMENTS

| | | | |
|---|---|---|---|
| 5,066,880 A * | 11/1991 | Banon | H02K 1/2773 310/410 |
| 5,444,313 A | 8/1995 | Oudet | |
| 5,559,378 A | 9/1996 | Oudet et al. | |
| 5,773,910 A * | 6/1998 | Lange | H02K 21/125 310/90 |
| 6,147,428 A * | 11/2000 | Takezawa | H02K 7/14 310/156.57 |
| 6,249,065 B1 | 6/2001 | Oudet et al. | |
| 6,323,572 B1 * | 11/2001 | Kinoshita | H02K 1/2766 310/156.55 |
| 6,342,745 B1 * | 1/2002 | Sakai | H02K 21/46 310/156.55 |
| 6,429,566 B1 * | 8/2002 | Kuwahara | H02K 1/2773 310/156.56 |
| 6,593,734 B1 | 7/2003 | Gandel et al. | |
| 6,800,977 B1 * | 10/2004 | Ostovic | H02K 1/2773 310/185 |
| 6,987,342 B2 * | 1/2006 | Hans | H02K 1/2766 310/156.56 |
| 7,196,446 B2 * | 3/2007 | Hans | H02K 1/2766 310/156.53 |
| 7,262,526 B2 * | 8/2007 | Shiga | H02K 15/03 310/156.28 |
| 7,589,445 B2 | 9/2009 | Gandel et al. | |
| 7,768,172 B2 * | 8/2010 | Takahata | H02K 1/276 310/156.56 |
| 7,898,122 B2 | 3/2011 | Andrieux et al. | |
| 7,906,882 B2 * | 3/2011 | Okuma | H02K 1/276 310/156.56 |
| 7,906,959 B2 | 3/2011 | Frachon et al. | |
| 8,138,650 B2 * | 3/2012 | Shiga | H02K 1/2786 29/598 |
| 8,860,282 B2 | 10/2014 | Gandel et al. | |
| 8,890,514 B2 | 11/2014 | Masson et al. | |
| 9,083,219 B2 * | 7/2015 | Choi | H02K 1/2773 |
| 9,225,209 B2 * | 12/2015 | Li | H02K 1/276 |
| 9,515,539 B2 | 12/2016 | Prudham et al. | |
| 9,714,849 B2 | 7/2017 | Biwersi et al. | |
| 9,831,729 B2 * | 11/2017 | Kim | H02K 1/274 |
| 10,050,487 B2 | 8/2018 | Biwersi et al. | |
| 10,164,486 B2 | 12/2018 | Hyppias et al. | |
| 10,432,049 B2 * | 10/2019 | Saint-Michel | H02K 1/2766 |
| 10,491,067 B2 * | 11/2019 | Fraser | H02K 1/2786 |
| 2005/0218727 A1 | 10/2005 | Gandel et al. | |
| 2006/0103253 A1 * | 5/2006 | Shiga | H02K 1/2786 310/43 |
| 2007/0252469 A1 * | 11/2007 | Nishiura | H02K 1/2773 310/156.56 |
| 2008/0284261 A1 | 11/2008 | Andrieux et al. | |
| 2009/0096314 A1 * | 4/2009 | Atarashi | H02K 16/02 310/156.53 |
| 2009/0230803 A1 * | 9/2009 | Nakayama | H02K 1/2766 310/156.56 |
| 2010/0213885 A1 * | 8/2010 | Ichiyama | H02K 21/12 310/156.46 |
| 2010/0277028 A1 * | 11/2010 | Alexander | H02K 1/2773 29/598 |
| 2011/0043194 A1 | 2/2011 | Frachon et al. | |
| 2011/0285238 A1 * | 11/2011 | Kusase | H02K 16/04 310/156.48 |
| 2012/0104905 A1 | 5/2012 | Prudham et al. | |
| 2012/0112591 A1 * | 5/2012 | Feuerrohr | H02K 1/2773 310/216.106 |
| 2012/0146627 A1 | 6/2012 | Masson et al. | |
| 2012/0200187 A1 * | 8/2012 | Sano | H02K 1/2766 310/156.07 |
| 2012/0228965 A1 * | 9/2012 | Bang | H02K 7/1838 310/156.02 |
| 2013/0038161 A1 * | 2/2013 | Pan | H02K 1/2773 310/156.01 |
| 2013/0057103 A1 * | 3/2013 | Han | H02K 1/2773 310/156.12 |
| 2013/0088111 A1 * | 4/2013 | Park | H02K 1/2773 310/216.135 |
| 2013/0093276 A1 * | 4/2013 | Kim | H02K 16/00 310/114 |
| 2013/0187486 A1 * | 7/2013 | Lee | H02K 1/278 310/43 |
| 2013/0187506 A1 * | 7/2013 | Lee | H02K 1/2773 310/156.12 |
| 2013/0270955 A1 * | 10/2013 | Lillington | H02K 1/2773 29/598 |
| 2013/0307363 A1 * | 11/2013 | Sano | H02K 1/2766 310/156.01 |
| 2014/0103769 A1 * | 4/2014 | Kingrey | H02K 1/2773 29/598 |
| 2015/0115758 A1 * | 4/2015 | Koka | H02K 21/14 318/139 |
| 2015/0123651 A1 | 5/2015 | Biwersi et al. | |
| 2015/0171684 A1 * | 6/2015 | McClelland | H02K 1/2746 310/156.07 |
| 2015/0263572 A1 | 9/2015 | Hyppias et al. | |
| 2015/0288233 A1 * | 10/2015 | Kim | H02K 1/2766 310/156.01 |
| 2016/0233734 A1 * | 8/2016 | Biwersi | H02K 1/146 |
| 2017/0141670 A1 | 5/2017 | Hyppias et al. | |
| 2017/0324284 A1 | 11/2017 | Andrieux et al. | |
| 2017/0338726 A1 | 11/2017 | Gandel et al. | |
| 2018/0062461 A1 * | 3/2018 | Gieras | H02K 21/14 |
| 2018/0248418 A1 * | 8/2018 | Walme | H02K 3/18 |

* cited by examiner

ROTOR WITH PERMANENT MAGNETS FORMING A PORTION OF A ROTOR CORE

CROSS-REFERENCE TO RELATED APPLICATIONS

This application is a National Phase entry of International Patent Application No. PCT/FR2018/050824, filed Apr. 3, 2018, which claims priority to French Patent Application No. 17/52831, filed Apr. 3, 2017, both of which are incorporated by reference herein.

TECHNICAL FIELD

This invention relates to a rotor of a brushless synchronous rotating electrical machine with an internal permanent magnet (IPM) configuration. Electrical machines with permanent magnets generally use rare earths such as samarium and neodymium, which have a high energy density and excellent structural strength.

However, the price of these raw materials fluctuates sharply and tends to increase specifically because of the scarcity of these rare earths extraction sites and of geopolitical choices that may artificially create shortages of these materials. The shaping of such magnets into particular configurations, for example with circular cylindrical shapes, thus involves industrial production costs that can be significant.

To overcome this situation, the concept of an electric motor with internal permanent magnets (IPM) has been developed. It consists in inserting into cavities formed in a ferromagnetic yoke, blocks of magnets with a geometry more economical to be produced and magnetized, which also enables the use of magnets with a larger volume. The use of magnets with lower performance, such as hard ferrites, can also be considered due to this larger volume.

In a way known per se, rotating electrical machines consist of a wound stator and a rotor integral with a shaft. The rotor is generally integral with a driving and/or driven shaft and can belong to a rotating electrical machine in the form of an alternator, an electric motor, or a reversible machine that can operate in both modes.

The stator is usually mounted in a recess configured to support the rotating shaft, for example through bearings or bushings. The stator has a body, or yoke, consisting of a stack of thin sheets forming a crown, the inner side of which is provided with slots open towards the inside to receive phase windings. In a distributed corrugated winding, the windings are obtained, for example, from a continuous enamel-coated wire or from conductive pin-shaped elements connected together by welding.

Alternatively, in a "concentric" winding, the phase windings consist of closed coils that are wound around the stator teeth. Protection between the sheet metal package and the winding wire is provided either by paper-type insulation, plastic by overmoulding or by means of an insert. These windings are multiphase windings connected in a star or delta configuration, the outputs of which are connected to an inverter.

In addition, the rotor consists of a body formed by a stack of metal sheets held in the form of a package by means of a suitable fixing system, such as rivets passing axially through the rotor, or with staples or with buttons or adhesive solutions. The rotor has poles formed by permanent magnets housed in cavities in the rotor body.

Rotating electrical machines coupled to a supercharger ("electric supercharger") are known. This electric supercharger at least partially compensates for the power loss of small internal combustion engines used on many motor vehicles to reduce fuel consumption and particulate emissions (the so-called "downsizing" principle).

For this purpose, the electric supercharger includes a propeller arranged on the intake duct upstream of the combustion engine to allow the intake air to be compressed in order to optimize the filling of the combustion engine cylinders.

The electrical machine is designed, for example, to drive the compressor turbine in order to minimize the torque response time, particularly during transient phases at acceleration, or during the automatic restart phase of the internal combustion engine after a stop and start operation.

BACKGROUND

Many rotor topologies are known for IPM type electrical machines.

For example, European patent application EP0803962 describes a rotor having permanent magnets for alternators, with a multitude of superimposed disc-shaped ferromagnetic sheets, with die-cut regions defining trapezoidal portions with curved bases, separated by radially extending slots. Sintered permanent magnets are introduced into the radially extending slots.

U.S. Patent Publication No. 2015/0288233 describes a rotor formed by a cylindrical main core having an inner diameter and an outer diameter with axial cavities in which radial magnet blocks are housed, each extending in a direction perpendicular to an outer circumference edge of the main core. These permanent magnets are magnetized so that opposite poles face each other with the radial nucleus being centered between them.

These solutions are not totally satisfactory because the performance remains relatively modest, especially for electrical machines running at high speed. For such machines, the magnets have to be wedged inside recesses because of the high centrifugal force exerted onto the magnets inserted in the cavities formed in the rotor. However, the peripheral holding areas of the rotors cannot be increased too much, as they are isthmuses creating a magnetic short-circuit.

One purpose of the invention is to optimize magnetic and mechanical performance by maximizing the magnet volume and therefore the power of the motor, while limiting the fracture zones subjected to high mechanical stresses during high speed rotations.

SUMMARY

For this purpose, the invention, in one example, relates to a rotor for an electrical machine having internal permanent magnets comprising a yoke consisting of a stack of sheets defining a plurality of recesses for receiving parallelepipedal permanent magnets, said recesses being surrounded by magnetically saturated external transverse isthmuses and lateral isthmuses, and by radial and oblique isthmuses, characterized in that:

said magnets are assembled in pairs of magnets magnetized in the same direction and perpendicular to the radial direction of the radial isthmuses arranged between said coupled magnets, said radial isthmuses having a thickness of less than 5% of the diameter of the rotor, and in that the perimeter of the cross-section of the rotor is formed by a succession of curved profiles, between two consecutive pairs of magnets, and tangential linear profiles, at the external transverse isthmuses.

Preferably, since one purpose of the invention is to maximize the cross section of magnets, the cumulative cross section of said magnets is greater than 40 percent (%) of the cross-section of the rotor. The cross section of the rotor is considered as the section of the rotor which comprises material, including a possible inserted mechanical shaft.

Preferably, magnets have a rectangular cross-section. However, the corners thereof may be provided with fillets or chamfers.

Alternatively, said magnets have a trapezoidal cross-section with symmetry with respect to the radial plane, the small base being directed towards the stator, outside the rotor.

In a first embodiment, two consecutive pairs of magnets are separated by solid material areas.

In a second embodiment, said yoke has openings between two pairs of magnets corresponding to the magnetic poles of the rotor.

Preferably, said lateral isthmuses are oriented radially and at a 45 degree (°) angle with respect to the radial isthmus. The invention is mainly intended for an electrical machine having two pairs of magnetized poles.

The invention also relates to the application of such a rotor to the manufacture of an engine, in particular a supercharger engine, or an electrical generator, comprising a stator having polar teeth, at least part of which is surrounded by an electric coil and a rotor having internal permanent magnets complying with the above-mentioned rotor.

BRIEF DESCRIPTION OF THE DRAWINGS

The present invention will be best understood upon reading the following detailed description of a non-restrictive exemplary embodiment, while referring to the appended drawings, wherein.

DETAILED DESCRIPTION

Figure 1A:
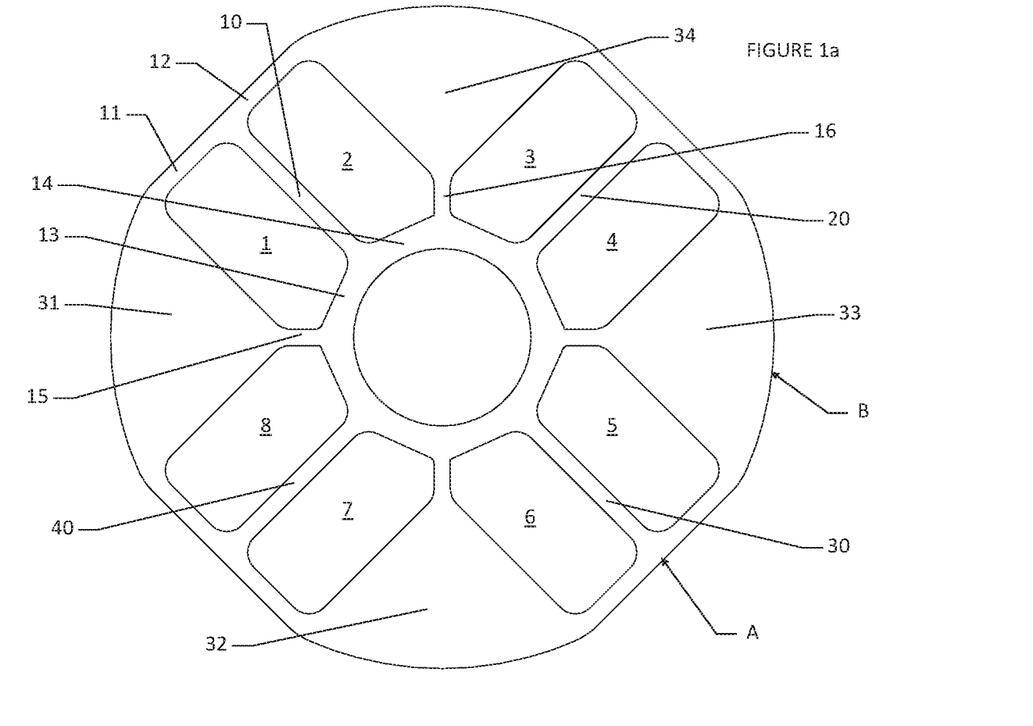
FIGS. 1a and 1b represent cross-sectional views of a yoke of a rotor according to the invention in a first embodiment, respectively without and with magnets.

In the first embodiment, the rotor yoke consists of a stack of sheets having a typical thickness of 0.2 to 0.5 millimetres, without this thickness being restrictive, cut to form recesses 1 to 8 forming pairs on either side of other isthmuses 10, 20, 30, 40. In the example described, the rotor has four cut pairs.

A pair of recesses 1, 2 are separated by a radially oriented isthmus 10, typically 0.5 mm thick. This thickness is not restrictive but it is important that this thickness is minimized to the effective possibility of production and mechanical resistance of the part, in order to minimize the surface occupied by the isthmuses 10, 20, 30, 40 relative to the rotor section that is visible in this FIG. 1.

The recesses 1 to 8 are delimited by isthmuses. The word "isthmus" means a narrow strip of ferromagnetic material, which provides a mechanical resistance function. These narrow isthmuses, each having a smaller thickness than the thickness of the other magnetic elements in the rotor, ensure mechanical strength without degrading magnetic performance.

A radial isthmus 10 radially extends from the centre of the rotor yoke through a pair of recesses 1, 2. An external transverse isthmus 11, 12 is substantially perpendicular to the radial isthmus 10 and positioned on the outer side of the recess 1 to 8. An oblique isthmus 13, 14 is located on the inner side of the recess 1 to 8 between the recess and the centre of the rotor yoke. A lateral isthmus 15, 16 is positioned between adjacent recesses of each pair of recesses and connects material areas 31 to 34 and the centre of the rotor yoke. The external transverse isthmuses 11, 12 and lateral isthmuses 15hh, 16 are magnetically saturated, whereas the radial isthmuses 10, 20 and oblique isthmuses 13, 14 are bands of matter with no magnetic saturation.

Thus, a pair of recesses 1, 2 are delimited on the outer side by external transverse isthmuses 11, 12 and on the inner side by oblique isthmuses 13, 14. In addition, the pair of recesses 1, 2 is delimited by two lateral isthmuses 15, 16 oriented radially and at a 45° angle to the radial isthmus 10.

Figure 1B:
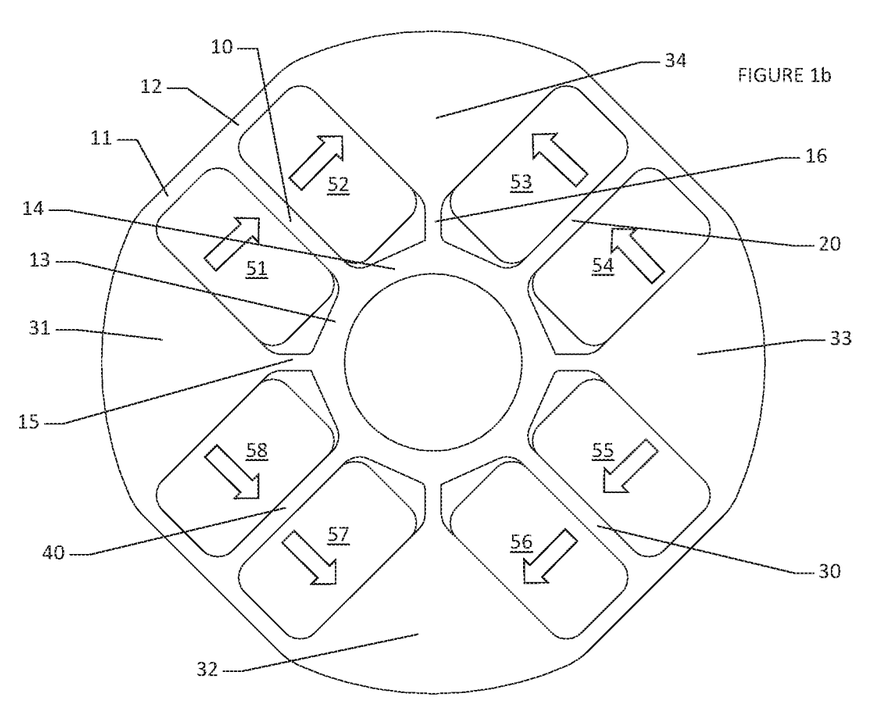

In this first embodiment shown in FIGS. 1a and 1b, the material areas 31, 32, 33, 34 between two pairs of cuts are solid and not opened.

Figure 2A:
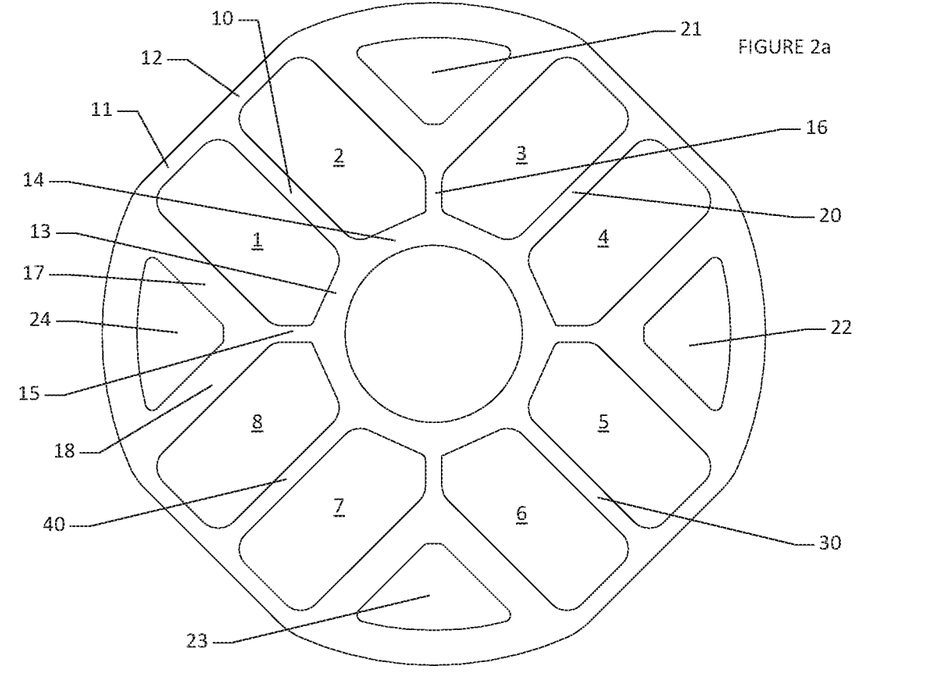
FIGS. 2a and 2b represent cross-sectional views of a yoke of a rotor according to the invention in a second embodiment, respectively without and with magnets.
Figure 2B:
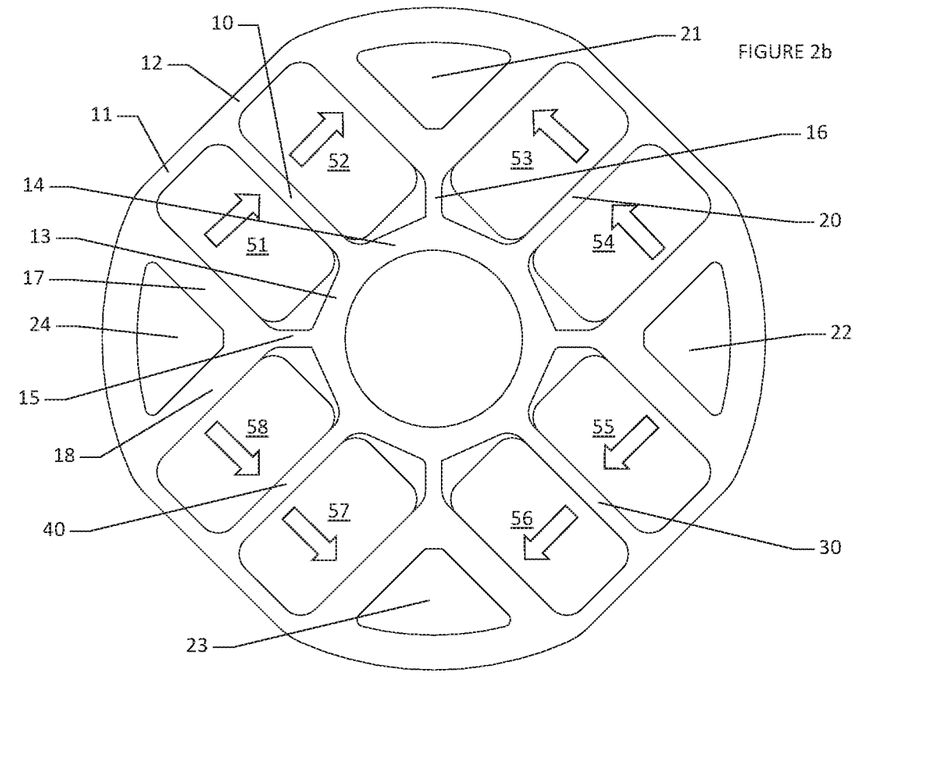

In the second exemplary embodiments of FIGS. 2a and 2b, the areas are recessed to form openings 21 to 24 enabling a reduction in the weight of the rotor (reduced inertia) and reduced mechanical stresses, particularly on the lateral isthmuses 15, 16 during high speed rotation.

Also in this second embodiment, the opening 24 defines two segments 17, 18 extending parallel to the isthmus 10 and connecting the outer end of the edge 15 to the end of the external transverse isthmus 11. These openings 21 to 24 thus ensure the mechanical cohesion of the yoke, without interrupting the material continuity of each sheet of the yoke in order to form, for each sheet used, a resistant one-piece element.

The thickness of the segments 17, 18 is typically greater than that of the lateral isthmuses 15, 16, the external transverse isthmuses 11, 12 and the radial isthmuses 10, typically by a factor of 2 to 4, in order to facilitate a passage of magnetic flux sufficient to avoid a marked magnetic saturation of the yoke material.

The external transverse isthmuses 11, 12 are oriented orthogonally to the radial isthmus 10 so as to form a characteristic T-shape, which gives a non-circular periphery but composed of successive curved profiles B between the segments 17, 18 and tangential linear profiles A at the external transverse isthmuses 11, 12.

The curved profiles B are preferably circular but may be deformed locally to adjust the residual torque without current or to sculpt the shape of the counter-electromotive force of the machine.

The linear profiles A reflect the fact that the external transverse isthmuses 11, 12 have a generally constant thickness. Small variations in thickness and therefore linearity are allowed by the invention, again with the aim of adjusting the residual torque without current or sculpting the shape of the counter-electromotive force of the machine, or to allow assembling and/or positioning functions of the magnets.

FIGS. 1b and 2b respectively show the first and second embodiments with the magnets 51 to 58 placed in the recesses 1 to 8. Typically, the magnets 51 to 58 are positioned, due to the magnetization, the direction of which is shown in FIGS. 1b and 2b by the thick arrows and due to the centrifugal force during operation, as they are in contact with the radial isthmus 10 and with the external transverse isthmuses 11, 12. Permanent magnets 51 to 58 are typically in the form of blocks with a parallelepiped cross-section, for example rectangular with fillets—as shown here—or chamfers (not shown), without the shape of the perimeter being restrictive.

Figure 3:
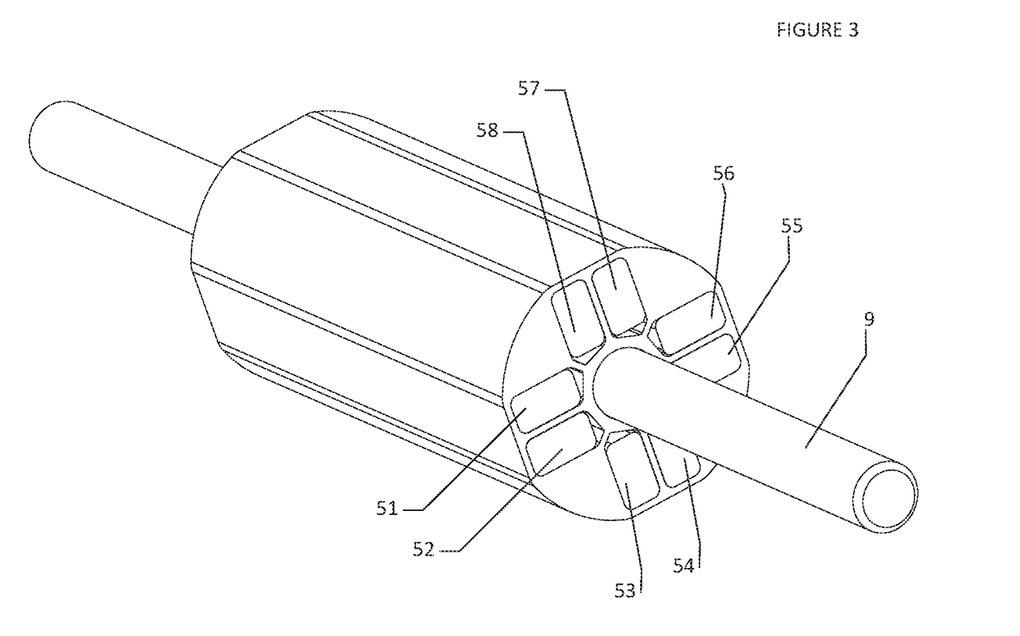
FIG. 3 represents a perspective view of an electrical machine according to a first embodiment of the invention.

FIG. 3 represents a perspective view of a rotor according to the invention in the first embodiment, consisting of a yoke as described in FIG. 1b, and a mechanical shaft 9 connecting to an external element to be moved, for example a turbine in the case of an application to an electrical supercharger. Magnets 51 to 58 magnetized in a direction perpendicular to the plane of the radial isthmus 10, i.e. a tangential direction, separating the two recesses 1, 2 are housed in each pair of recesses 1, 2. However, the magnetization direction may deviate by a few degrees from the tangential direction in order to adjust the residual torque and counter-electromotive force of the machine.

Figure 4:
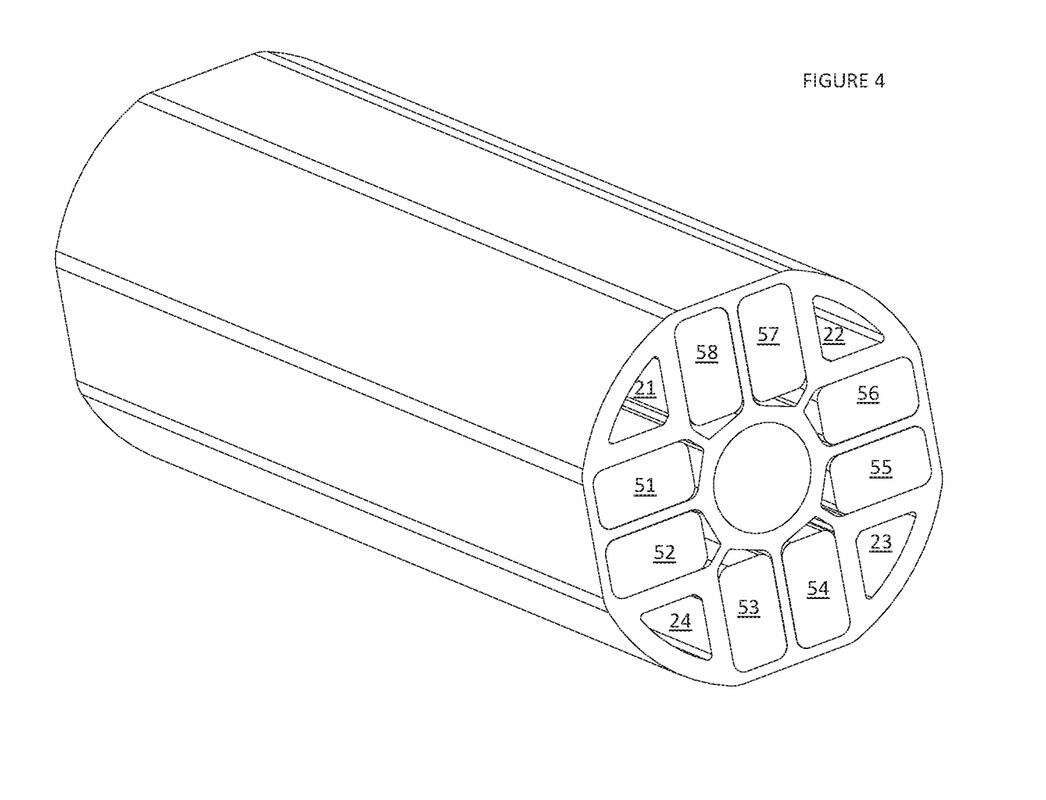
FIG. 4 shows a longitudinal cross-sectional view of a device according to the invention, according to a second embodiment.

FIG. 4 shows a perspective view of a rotor formed by a yoke as described in the second embodiment in FIG. 2b with magnets 51 to 58 being mounted. The yoke is made of a stack of sheets, not visible here for reasons of clarity.

Figure 5:
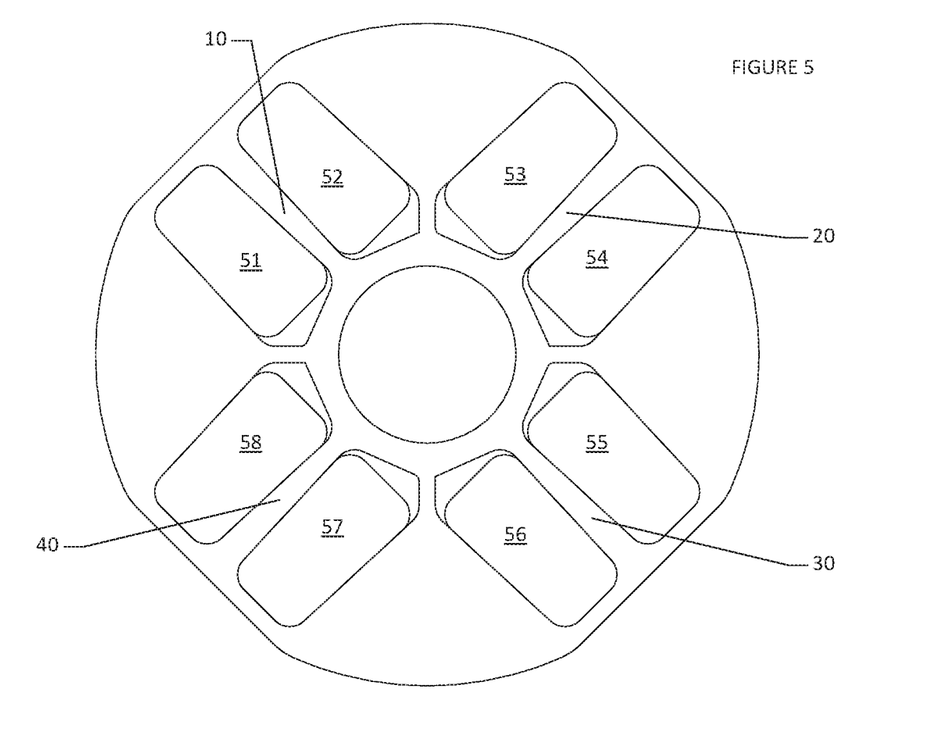
FIG. 5 shows a perspective view of a rotor according to the invention in an alternative mode where the magnets have a trapezoidal cross-section.

FIG. 5 shows an alternative embodiment of the rotor for which said magnets 51 to 58 have a trapezoidal cross-section with symmetry with respect to the radial plane 10, 20, 30, 40, the small base being directed towards the stator. This magnet shape can be advantageous in order to improve the holding power of the magnets and the mechanical strength of the rotor.

Figure 6A:
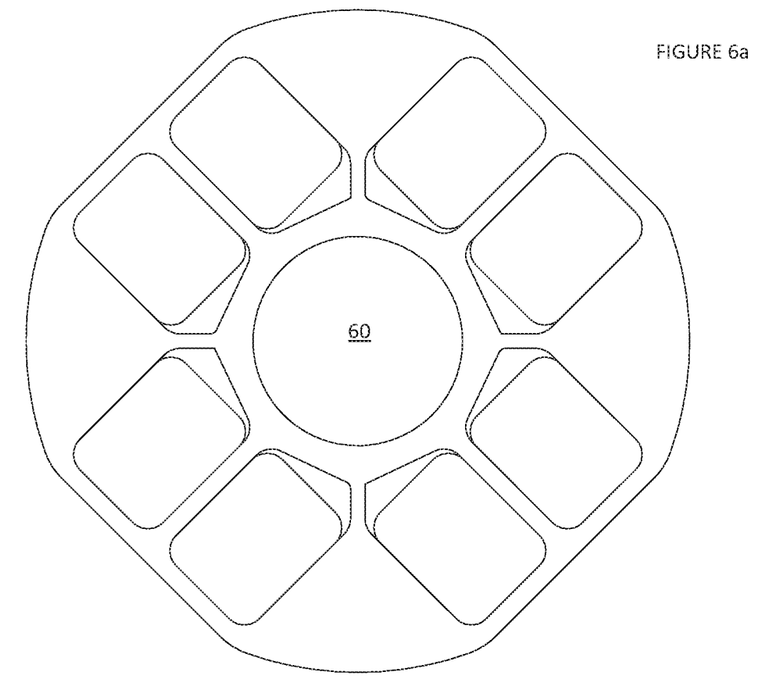
FIGS. 6a and 6b show alternative embodiments in which the inner diameter, for the passage of a mechanical shaft, can vary.
Figure 6B:
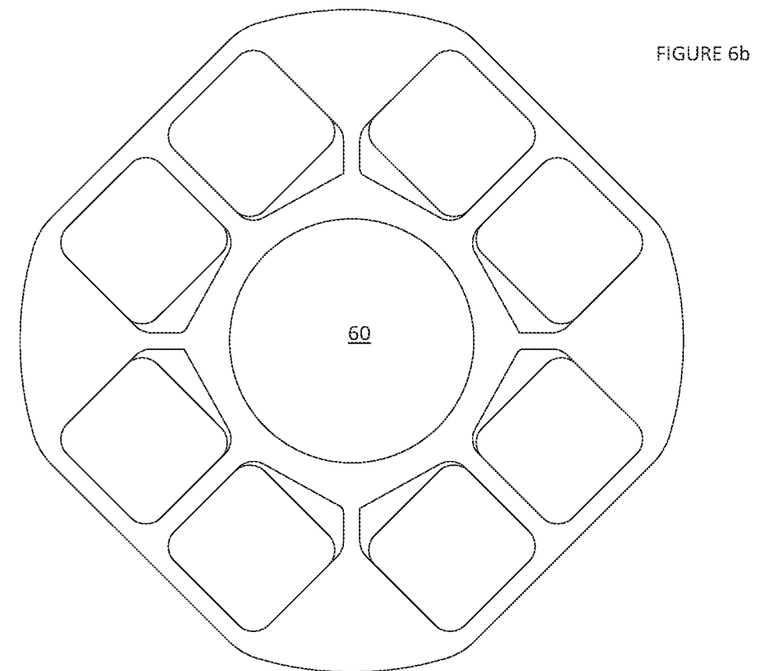

FIGS. 6a and 6b show embodiments in which the central space 60, which is used to accommodate a mechanical shaft for transmitting the power of the electrical machine, has a different size.

Figure 7:
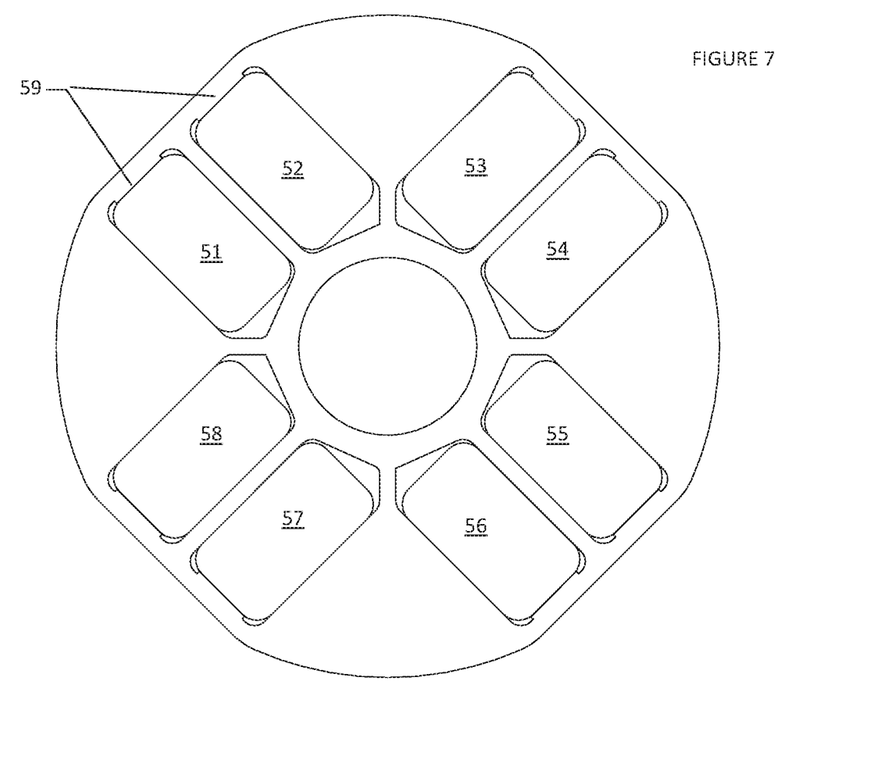
FIG. 7 shows an alternative embodiment in which the stator has pins for positioning magnets.

FIG. 7 shows one embodiment that uses positioning pins 59 to ensure that the magnets 51 to 58 contact the radial bottom of the recesses 1 to 8.

Figure 8A:
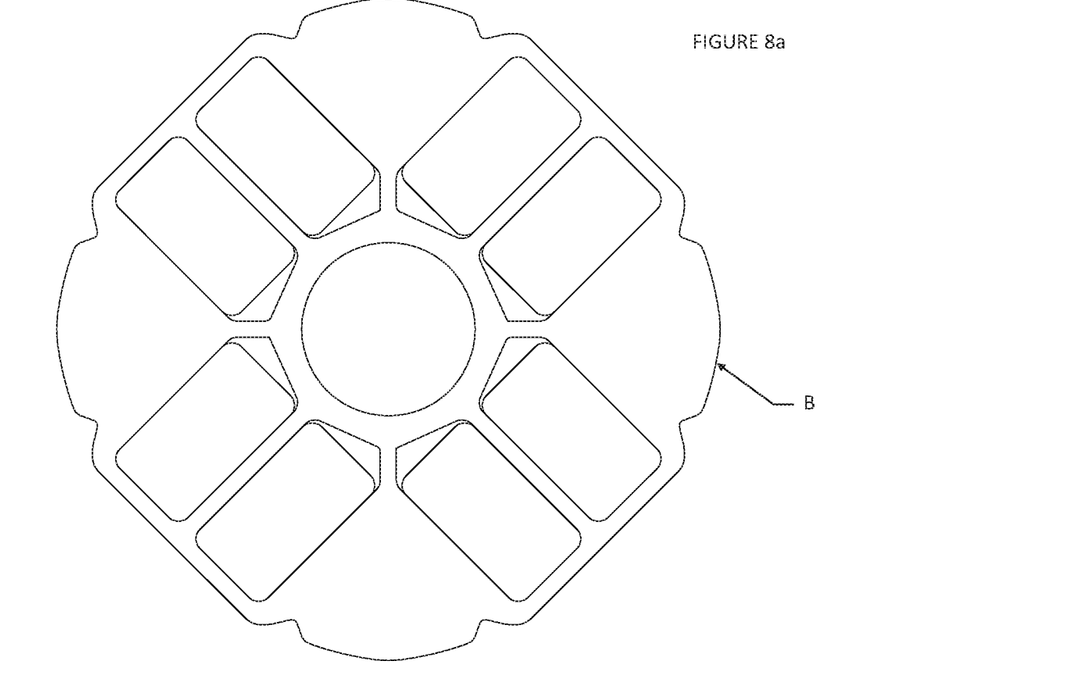
FIGS. 8a and 8b show alternative embodiments in which the curved profile, between two consecutive pairs of magnets, is different.
Figure 8B:
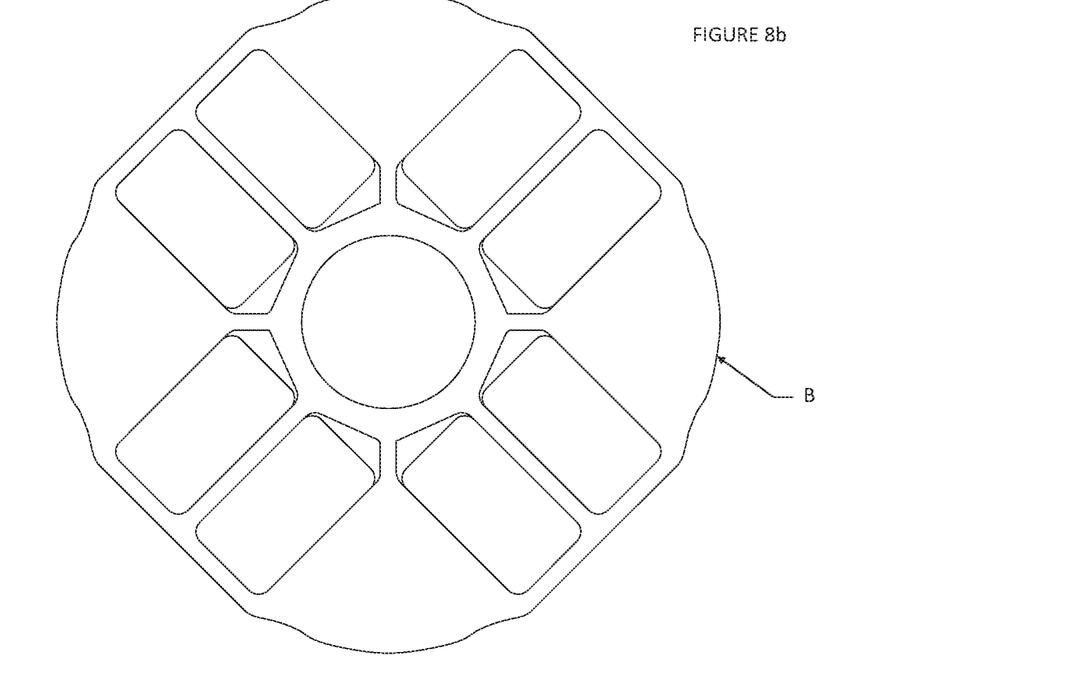

FIGS. 8a and 8b show alternative embodiments where the curved profiles B, between two consecutive pairs of magnets, are variable in order to manage the pairs with and without current. The modification of these profiles can be carried out by means of iterative tests.

The invention claimed is:

1. A rotor for an electrical machine having internal permanent magnets, the rotor comprising:
   a yoke including a stack of sheets defining a plurality of recesses for receiving parallelepipedal permanent magnets, the recesses being surrounded by magnetically saturated external transverse isthmuses and lateral isthmuses, and by radial isthmuses, and oblique isthmuses, the oblique isthmuses are located on an inner side of the recesses between the recesses and a center of the yoke, wherein:
   the magnets are assembled in pairs of magnets magnetized in a same direction and perpendicular to a radial direction of the radial isthmuses arranged between the pairs of magnets;
   the radial isthmuses have a thickness of less than 5 percent of a diameter of the rotor;
   a perimeter of a cross-section of the rotor is formed by a succession of curved profiles between two consecutive pairs of magnets and tangential continuously linear profiles, the tangential continuously linear profiles formed by two of the external transverse isthmuses and an end of one of the radial isthmuses disposed between the two of the external transverse isthmuses, the external transverse isthmuses being linear and positioned perpendicular to the one of the radial isthmuses and disposed on outer sides of respective recesses of the plurality of recesses; and
   a surface of the radial isthmuses is minimized and less than the transverse isthmuses and the lateral isthmuses.

2. The rotor according to claim 1, wherein a cumulative cross-section of the magnets is greater than 40 percent of the cross-section of the rotor.

3. The rotor according to claim 1, wherein the magnets have a rectangular cross-section.

4. The rotor according to claim 1, wherein the magnets have a trapezoidal cross-section with symmetry with respect to a plane of the radial isthmuses, a small base of the trapezoidal cross-section being directed towards a stator of the electric machine.

5. The rotor according to claim 1, wherein the yoke has openings between two pairs of magnets corresponding to magnetic poles of the rotor.

6. The rotor according to claim 1, wherein the lateral isthmuses are oriented radially and at a 45 degree angle with respect to the radial isthmuses.

7. The rotor according to claim 1, wherein two consecutive pairs of magnets are separated by solid material areas.

8. An electrical machine comprising:
   a stator having polar teeth, at least a part of which is surrounded by an electric coil; and
   a rotor having internal permanent magnets including a yoke formed by a stack of sheets defining a plurality of recesses for receiving parallelepipedal permanent magnets, the recesses being surrounded by magnetically saturated external transverse isthmuses, by radial isthmuses, lateral isthmuses and oblique isthmuses, wherein:
   the magnets are assembled in pairs of magnets magnetized in a same direction and perpendicular to a radial direction of the radial isthmuses arranged between the pairs of magnets;
   the radial isthmuses have a thickness of less than 5 percent of a diameter of the rotor;
   a perimeter of a cross section of the rotor is formed by a succession of curved profiles between two consecutive pairs of magnets and tangential continuously linear profiles, the tangential continuously linear profiles formed by two of the external transverse isthmuses and an end of one of the radial isthmuses disposed between the two of the external transverse isthmuses, the external transverse isthmuses being linear and positioned perpendicular to the one of the radial isthmuses and disposed on outer sides of respective recesses of the plurality of recesses; and
   a surface of the radial isthmuses is less than the transverse isthmuses and the lateral isthmuses.

9. An electrical compressor comprising:
   a turbine driven by a motor including a stator having polar teeth, at least a part of which is surrounded by an electrical coil, and a rotor having internal permanent magnets including a yoke formed by a stack of sheets defining a plurality of recesses for receiving parallelepipedal permanent magnets, the recesses being surrounded by magnetically saturated external transverse isthmuses, radial isthmuses, lateral isthmuses and oblique isthmuses, wherein:

the magnets are assembled in pairs of magnets magnetized in a same direction and perpendicular to a radial direction of the radial isthmuses arranged between the pairs of magnets;

the radial isthmuses have a thickness of less than 5 percent of a diameter of the rotor; and a perimeter of a cross section of the rotor is formed by a succession of curved profiles between two consecutive pairs of magnets and tangential continuously linear profiles, the tangential continuously linear profiles formed by two of the external transverse isthmuses and an end of one of the radial isthmuses disposed between the two of the external transverse isthmuses, the external transverse isthmuses being linear and positioned perpendicular to the one of the radial isthmuses and disposed on outer sides of respective recesses of the plurality of recesses; and the radial isthmuses are less than the transverse isthmuses and the lateral isthmuses.

* * * * *